No. 703,571. Patented July 1, 1902.
A. K. GOODRICH.
PLOW.
(Application filed Aug. 7, 1901.)
(No Model.)
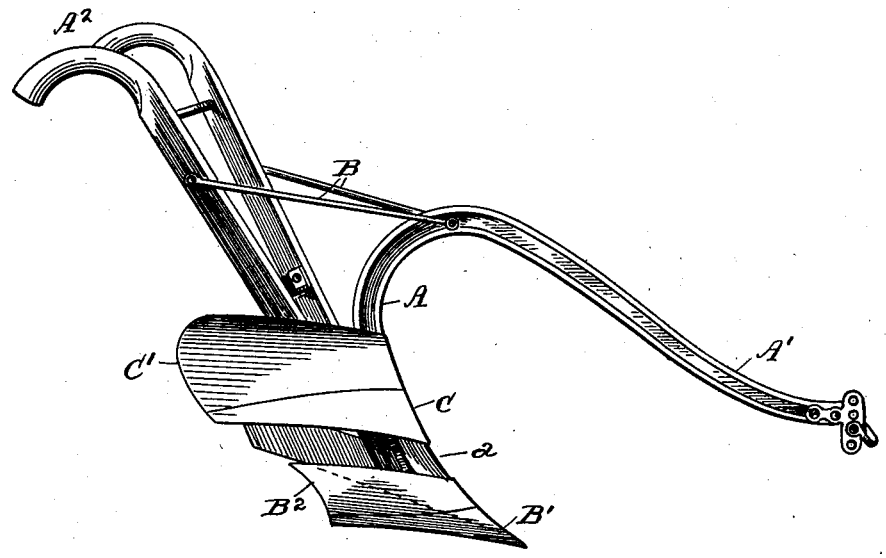

UNITED STATES PATENT OFFICE.

ALFRED K. GOODRICH, OF SAN FRANCISCO, CALIFORNIA, ASSIGNOR TO GEORGE H. BAHRS, OF SAN FRANCISCO, CALIFORNIA.

PLOW.

SPECIFICATION forming part of Letters Patent No. 703,571, dated July 1, 1902.

Application filed August 7, 1901. Serial No. 71,129. (No model.)

*To all whom it may concern:*

Be it known that I, ALFRED K. GOODRICH, a citizen of the United States, residing in the city and county of San Francisco, State of California, have invented certain new and useful Improvements in Plows; and I do hereby declare the following to be a full, clear, and exact description of the same.

The present invention relates to improvements in plows for use in connection with the work of cutting and turning a furrow and loosening the subsoil below the main furrow, the object of the invention being the production of an improved combined subsoil and surface plow.

To comprehend the invention, reference should be had to the accompanying sheet of drawing.

In the drawing the letter A is used to indicate an ordinary plow-standard, A' the draft-beam, and $A^2$ the plow-handles, which handles are connected at the upper portion to the beam A' by braces B. To the lower end of the standard A is attached the share B', from which extends the wing $B^2$. The wing and share constitute the subsoil-share for the plow, the function of which is to loosen the soil at a depth below the furrow proper. Owing to the shape of the said share, the soil is only loosened or broken and not turned over, as is usual with the surface-plow. A slight distance above the subsoil-share is arranged the share C, to which is attached the moldboard C'. The moldboard C' and share C constitute the surface-share of the plow, in contradistinction to the subsoil-share. As arranged a space *a* exists between moldboard C' and the wing $B^2$ of the subsoil-share. The moldboard C' is of the usual shape, and its purpose is to turn over the furrow cut by the share during travel of the plow.

By the employment of the hereinbefore-described plow the subsoil is loosened and the main furrow cut and turned at one operation, the expense of second plowing being thus avoided.

The space left between the shares serves to separate the cut layers and prevents the surface-share turning the subsoil layer with the main or surface furrow.

Having thus described the invention, what is claimed as new, and desired to be protected by Letters Patent, is—

In a plow, the combination with a goose-necked beam A' and standard A continuous from end to end, a subsoil-share B' secured to the lower end of the standard, a wing $B^2$ carried by said share, a surface-share C secured to said standard near the upper portion thereof so as to leave a space between the same and said first-mentioned share, a moldboard C' carried by said surface-share, separated operating-handles projecting rearwardly from said shares, and braces B, B, one between each handle and the rear portion of the beam A'; substantially as described.

In testimony whereof I have hereunto affixed my signature, in the presence of witnesses, in the city and county of San Francisco, State of California, this 30th day of July, 1901.

ALFRED K. GOODRICH.

In presence of—
 N. A. ACKER,
 D. B. RICHARDS.